(12) United States Patent
Ullanoormadam

(10) Patent No.: US 7,807,208 B2
(45) Date of Patent: *Oct. 5, 2010

(54) TRANS FREE HARD PALM OIL FRACTION, TRANS FREE NON-HYDROGENATED HARD STRUCTURAL FAT AND FAT BLENDS AND METHODS

(75) Inventor: Sahasranamam Ramasubramaniam Ullanoormadam, Kuala Lumpur (MY)

(73) Assignee: Premium Vegetable Oils Berhad (MY)

( * ) Notice: Subject to any disclaimer, the term of this patent is extended or adjusted under 35 U.S.C. 154(b) by 1093 days.

This patent is subject to a terminal disclaimer.

(21) Appl. No.: 10/929,297

(22) Filed: Aug. 30, 2004

(65) Prior Publication Data

US 2005/0069620 A1 Mar. 31, 2005

Related U.S. Application Data

(62) Division of application No. 09/766,158, filed on Jan. 19, 2001, now Pat. No. 6,808,737.

(30) Foreign Application Priority Data

May 29, 2000 (MY) ............................. PI 20002388

(51) Int. Cl.
 *A23D 9/00* (2006.01)
(52) U.S. Cl. .................. 426/606; 426/417; 426/607
(58) Field of Classification Search ................ 426/606, 426/607, 417
See application file for complete search history.

(56) References Cited

U.S. PATENT DOCUMENTS

| 4,055,679 | A |   | 10/1977 | Kattenberg et al. |
|---|---|---|---|---|
| 4,214,012 | A |   | 7/1980 | Ainger et al. |
| 4,410,557 | A |   | 10/1983 | Miller |
| 4,839,191 | A |   | 6/1989 | Luddy et al. |
| 5,231,200 | A |   | 7/1993 | Kuwabara et al. |
| 5,401,867 | A | * | 3/1995 | Sitzmann et al. ............ 554/211 |
| 5,547,698 | A |   | 8/1996 | Lansbergen et al. |
| 5,602,265 | A |   | 2/1997 | van den Kommer et al. |
| 5,667,837 | A |   | 9/1997 | Broomhead et al. |
| 5,849,940 | A |   | 12/1998 | Harris et al. |
| 5,858,445 | A |   | 1/1999 | Huizinga et al. |
| 5,874,599 | A |   | 2/1999 | Harris et al. |
| 5,879,735 | A |   | 3/1999 | Cain et al. |
| 5,888,575 | A |   | 3/1999 | Lansbergen et al. |
| 6,156,370 | A |   | 12/2000 | Huizinga et al. |
| 6,238,723 | B1 |   | 5/2001 | Sassen et al. |
| 7,618,670 | B2 | * | 11/2009 | Ullanoormadam .......... 426/607 |

FOREIGN PATENT DOCUMENTS

| CA | 2 098 314 |   | 12/1994 |
|---|---|---|---|
| EP | 0 209327 A2 |   | 1/1987 |
| EP | 0 399 597 A2 |   | 11/1990 |
| GB | 1245539 |   | 9/1971 |
| GB | 2 270 925 A |   | 3/1994 |
| WO | WO96/05279 | * | 2/1996 |
| WO | WO 96/19115 |   | 6/1996 |

OTHER PUBLICATIONS

Gibbon, V. et al. 2002. Latest trends in dry fractionation. Lipid Technology, Mar. 2002, p. 33-36.*
Kellens, M. 1996. Developments in Fractionation Technology: Use of High Pressure Membrane Filter Presses in Dry Fractionation. Proceedings of the 1996 PORIM international Palm Oil Congress, Palm Oil Research Institute, Malaysia, p. 335-345.*
Tirtiaux, A. 1989. Dry Fractionation. Lipid Technology 1(1)17-20.*
Gibbon, V. et al. 2002. Latest trends in dry fractionation. Lipid Technology, Mar. 2002, p. 33-36.*
Willner, T. 1994. High-pressure dry fractionation for confectionery fat production. Lipid Technology, May/Jun. 1994, p. 57-60.*
Swern, D. 1979. Bailey's Industrial Oil and Fat Products, vol. 1, 4th edition, John Wiley & Sons, New York, p. 363.*
Francis, F. J. 2000. Food Science and Technology, $2^{nd}$ edition, vol. 3, John Wiley & Sons, Inc., New York, p. 1839-1844.*
Hui, Y. H. et al. 1996. Bailey's Industrial Oil and Fat Products, $5^{th}$ edition, vol. 2, John Wiley & Sons, Inc, New York, p. 338.*

(Continued)

*Primary Examiner*—Carolyn A Paden
(74) *Attorney, Agent, or Firm*—St. Onge Steward Johnston & Reens LLC

(57) ABSTRACT

A trans free hard palm oil fraction, a trans free non hydrogenated hard structural fat and a fat blend using the trans free non hydrogenated hard structural fat and liquid oils suitable for the manufacture of low SAFA (Saturated Fatty Acid) high poly/mono unsaturated margarine and spreads, wherein the trans free non hydrogenated hard structural fat is made from a selectively fractionated non-hydrogenated high melting palm oil fraction which is interesterified with dry fractionated non-hydrogenated lauric fat, such as a palm kernel oil or its fractions, the resultant interesterified fat is obtained with high yield ratios that can be economically and commercially used as trans free non hydrogenated hard structural fat for the aforesaid manufacture.

15 Claims, No Drawings

OTHER PUBLICATIONS

Van Duijm, Technical aspects of trans reduction in margarines, OCL, vol. 7, No. 1, Jan./Feb. 2000.

Van Den Kommer and Keulemans, Developments in Dry Fractionation of Fats, SCI Lecture Papers Series, London, Mar. 9, 1994.

Kun, et al., Palm Oil Dev., Palm Oil Research Institute of Malaysia, Mar. 1992.

Hui, Y.H. 1996. Bailey's Industrial Oil and Fat Products, 5th edition, vol. 4, John Wiley & Sons, Inc., NY, pp. 301, 307-323, 326-329.

Siew, W.L. et al. 1993. Identity Characteristics of Malaysian Palm Oil Products: Fatty Acid and Triglyceride Composition and Solid Fat Content. ELAEIS 5(1)38-46.

Kheiri, M.S.A. 1985. Palm Oil Products in Cooking Fats. JAOCS 62(2) 410-416.

List, G.R. et al. 1995. Preparation and Properties of Zero Trans Soybean Oil Margarines. JAOCS 72:383.

List, G.R. et al. 1995. Margarine and Shortening Oils by Interesterification of Liquid and Trisaturated Triglycerides. JAOCS 72:379.

List, G.R. et al. 1977. "Zero trans" Margarines: Preparation, Structure, and Properties of Interesterified Soybean Oil-Soy Trisaturate Blends. JAOCS 54:408.

List, G.R. et al. 1997. Effect of Interesterification on the Structure and Physical Properties of High-Stearic Acid Soybean Oils. JAOCS 74:327.

Ray, S. et al. 1996. Comparative Nutritional Quality of Palmstearin-Liquid Oil Blends and Hydrogenated Fat (vaanaspati). JAOCS 74:617.

Ghosh, S. et al. 1997. Utilization of High-Melting Palm Stearin in Lipase-Catalyzed Interesterification with Liquid Oils. JAOCS 74:589.

Aini, I. et al. 1999. Trans-Free Vanaspati Containing Ternary Blends of Palm Oil-Palm Stearin-Palm Olein and Palm Oil-Palm Stearin-Palm Kernel Olein. JAOCS 76:643.

Petrauskaite, V. et al. 1998. Physical and Chemical Properties of Trans-Free Fats Produced by Chemical Interesterification of Vegetable Oil Blends. JAOCS 75:489.

Kok, L. et al. 1999. Trans-Free Margarine from Highly Saturated Soybean Oil. JAOCS 76:1175.

Heckers, H. 1978. Trans-isomeric fatty acids present in West German margarines, shortenings, frying and cooking fats. Am. J. of Clinical Nutrition 31:1041.

D'Souza, V. et al. 1991. Chemical and Physical Properties of the High Melting Glyceride Fractions of Commercial Margarines. JAOCS 68:153.

Schweitzer III, 1994. Developments in Dry Fractionation of Fats from Oils and Fats Group symposium Fractional Crystallisation of Fats held in London on Mar. 8, 1994, 0040.

* cited by examiner

TRANS FREE HARD PALM OIL FRACTION, TRANS FREE NON-HYDROGENATED HARD STRUCTURAL FAT AND FAT BLENDS AND METHODS

RELATED APPLICATION

This is a division of U.S. patent application Ser. No. 09/766,158, filed Jan. 19, 2001, which issued as U.S. Pat. No. 6,808,737, which claims the benefit of Malaysian Application Serial No. 20002388, filed May 29, 2000.

BACKGROUND AND SUMMARY OF THE INVENTION

Historically fat blends suitable for the manufacture of margarine/spreads, fat products and the like were designed to satisfy customer requirements such as significant cooling impact, a rapid sharp melt sensation, and not having a coated or waxy feel on the tongue. In addition, it should impart temperature cycling stability (heat stability) as well as spread ability when taken out frequently from the refrigerator as a prominent feature.

To achieve these objectives, fat blends suitable for the manufacture of margarine and spreads and the like are being formulated using hard stocks derived by hydrogenation of liquid oils. However, with the adverse effect of trans fatty acids being published, consumers are looking for margarine/spreads with practically no trans fatty acids.

Suitable trans free margarine/spreads production can be achieved by using fully hydrogenated fats as structural fat, which usually does not contain trans fatty acid or a very negligible amount. However, hydrogenation processes are generally viewed as the main reason for the development of trans fatty acids in oils and fats. Hence, there is a strong consumer perception against usage of any hydrogenated oil/fat in food products including margarine/spreads.

The present invention serves to develop fat blends suitable for the manufacture of margarine/spreads, fat products and the like using no hydrogenated fats/oils in the blend at the same time serving to reduce the saturated fatty acid levels (hereinafter referred to as SAFA) as well as trans fat levels in the products.

The following abbreviations are used in the present specification: FA=fatty acid, PUFA=poly-unsaturated acid(s), SAFA=saturated fatty acid(s), MFA=Mono unsaturated Fatty Acids, H=saturated FAs with carbon numbers greater than or equal to 16, M=saturated FAs with carbon numbers less than or equal to or less than 14. H-3 refers to triglycerides with 3-carbon chain of length C16 and above that are saturated. $H_2M$ refers to triglycerides which has 2 carbon chain that are C16 and above and saturated and one chain of carbon length C14 and below. Tg's=tri glycerides.

In this description all parts, proportions and percentages are by weight; the amount of fatty acids in an oil or fat is based on the total amount of fatty acids in the oil or fat and the amount of hard stock and/or hard fat in the fat composition is based on the total weight of the fat composition, unless otherwise stated.

For a better understanding of the invention, some practical embodiments thereof have been described in the following examples. Parts and percentages as used in these examples, the description and the claims refer to weights unless otherwise indicated. For general information on the manufacturing of spreads, reference may be made to various text books, e.g. The Chemistry and Technology of Edible Oils and Fats and their High Fat Products by G. Hoffmann; Academic Press London 1989, page 319 ff and in particular page 320-321. Further, carbon number analysis as described herein is a well-known technique in the art. A suitable description is example given in EP 78,568.

"Fractionation" is a process used for the separation of high melting components from a feed stock, The higher melting solid fraction obtained is called a "stearin" fraction and the lower melting liquid fraction is called an "olein" fraction. Throughout this illustration, the term stearin fraction as well as term olein fraction means higher melting fraction and lower melting fraction respectively.

Interesterification process is a well-known art and a more recent review of the same is published by Rozendaal & Macrae (1997). When an interesterification process is carried out using alkali metal catalyst (0.1-0.2% sodium methoxide catalyst ((sodium methylate ($NaOCH_3$)-UN No. 143 also known as Natrium Methylate is used as catalyst), it leads to a random distribution of triglycerides in which the fatty acids are distributed randomly over the 1-2- and 3-position of the glycerol moiety. The number of tri-glycerides produced by interesterifying a fatty mixture containing n fatty acids is: $\frac{1}{2}(n^2+n^3)$.

DESCRIPTION OF THE INVENTION

The present invention is concerned with a trans free hard structural fat suitable for the manufacture of low SAFA (Saturated Fatty Acid) poly/mono unsaturated margarine and spreads and fat blends for margarine/spreads using the above mentioned structural fat. This structural fat is made from selectively fractionated non-hydrogenated palm oil fraction, which is interesterified with dry fractionated non-hydrogenated palm kernel fraction to obtain hard structural fat with high yield ratios that can be economically and commercially used as structural fat for the manufacture of trans free low SAFA, poly unsaturated/mono unsaturated margarine/spreads.

The hard stock contributes triglycerides especially of the trisaturated type. A certain minimum quantity of these is essential to provide the "structural fat" and to prevent oiling out of the liquid oil. From the patent literature and general experience, this minimum quantity is around 6%. More is acceptable and desirable if the amount of $H_3$ tri-glycerides, and especially tristearin, is not greater than 2% otherwise poor consumer mouth feel will result. Hence content of $H_2M$ triglycerides is valuable, to give the structuring effect. Hence, the need for a lauric oil.

When the hard stock components are interesterified, the amounts of trisaturated triglycerides in the interesterified product are determined entirely by the content of saturated fatty acids in the blend. This relationship is very critical as shown by the results:

| % Saturated Fatty Acid in the Oil blend | % Trisaturated Triglycerides After Interesterification |
|---|---|
| 50 | 13 |
| 60 | 22 |
| 70 | 34 |
| 80 | 51 |
| 90 | 73 |

Taking sunflower oil as the PUFA oil to be used in the blend, at a level of 80% (SAFA 10.3%) then the hard stock should not contribute more than 11.76% SAFA to the final blend considering that the SAFA content of polyunsaturated margarine should not exceed 20%. If 20% of the hard stock were used for the margarine blend along with Sunflower oil as above (a high usage level)—and if we also want a minimum 6% trisaturated Tgs in the final blend, it can be seen from the above table that the SAFA content of the hard stock must be about 67% so that interesterified hard stock has 30% trisaturated triglyceride. Assuming only 15% hard stock is used then the SAFA content of the hard stock must be about 74%, so that it has 40% trisaturated triglyceride after interesterification. These are minimum requirements and a higher amount of trisaturated Tgs would be desirable. The usage of hard structural fat in the blend can be 5 to 25% and the liquid oil or its blends can be 95-75%.

By way of summary, a margarine blend and spread consisting of 60-95% of a liquid oil such as sunflower oil, Canola oil, soy oil, peanut oil, rice bran oil, olive oil, safflower oil, corn oil or marine oil or a blend of any of the above liquids is blended with a trans free hard structural fat at 5-40% level. Said hard structural fat is made from selectively fractionated non-hydrogenated palm oil fraction, which is interesterified with lauric fat such as dry fractionated non-hydrogenated palm kernel fraction without using a hydrogenation process nor using an organic solvent or detergent for fractionation.

The margarine/spread fat blend has a liquid oil blend which preferably has a high poly/mono unsaturated level such that in the total fat blend the poly/mono unsaturation level exceeds 40% to better support health claims (high poly/mono unsaturated, low saturated fatty acid (SAFA) margarine/spreads can be made).

The hard palm fraction has a C16 carbon chain residue greater than 70% preferably greater than 80% and most preferably greater than 84%. The hard palm fraction has a melting point higher than 57 Deg C., preferably greater than 60 Deg C. and can be flaked for easy handling because of its high melting point in spite of not being required to undergo hydrogenation and has a solid fat content of >75% at 40 Deg C. preferably >80% solids at 40 Deg C. The palm fat/palm oil or its stearin fraction is selectively dry fractionated by melt crystallization process to harvest the hard palm fraction with C16 level of >75%, preferably >83% with a total unsaturation level of <15% preferably less than 10%.

The palm fat/oil is dry fractionated using a two-step melt crystallization process, the first step being performed between 20-25 degrees Celsius, preferably between 22-24 degrees Celsius, to obtain a medium had palm fraction. The medium hard palm fraction is then once again dry fractionated between 45-55 degrees Celsius, more preferably 49-52 degrees Celsius (depending of the iodine number of the first dry fraction) to harvest very hard palm fraction rich in C16 fatty acids of at least 70%.

The palm fraction in the second fractionation step is separated in a high pressure membrane type filter wherein a pressure of 10-35 bar (preferably >20 bar, most preferably >30 bar) is used to inflate the membrane so as to remove the liquid fraction occluded in the hard fat, thus eliminating the requirement of solvent fraction method. This does not exclude use of high pressure hydraulic pressing of the cooled slab of palm oil fraction to obtain the same desired hard palm fat suitable for the manufacture of hard structural fat.

The hard structural fat is produced by interesterification reaction of hard palm fraction with hard palm kernel fraction. The resultant hard fat is not further fractionated but used as such as a hard structural fat, thus eliminating the disposal problems of by-product fractions, resulting in a high yield of the structural fat at a low cost.

Preferably, the hard structural fat is produced by interesterification reaction of hard palm fraction with hard palm kernel fraction in such a way that the hard structural fat has a trisaturated triglyceride of $H_3$ type is less than 25% preferably less than 20% wherein "H" denotes saturated fatty acid residues with carbon numbers greater than or equal to 16.

It should be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

The invention claimed is:

1. A method of making a hard palm oil fraction, comprising:
   selectively dry fractionating palm oil, or a stearin fraction thereof, by a melt crystallization process;
   said hard palm oil fraction is produced using a two-step melt crystallization process, without the use of a solvent and without further fractionation;
   a first step of said two-step melt crystallization process comprises crystallizing said palm oil or stearin fraction thereof at a first temperature within a range of about 22 degrees Celsius to about 25 degrees Celsius, and filtering a crystallized slurry of said palm oil or stearin fraction thereof through a membrane filter, said first step producing a medium hard palm oil fraction;
   a second step of said two-step melt crystallization process comprises crystallizing said medium hard palm oil fraction at a second temperature, greater than said first temperature, said second temperature being within a range of about 45 degrees Celsius to about 55 degrees Celsius;
   in a second filtration step, filtering a crystallized slurry of said medium hard palm oil fraction through a high pressure membrane type filter by applying pressure to the filtered stearin fraction by inflating membranes of said high pressure membrane type filter;
   said second filtration step producing a very hard palm oil fraction with a C16 carbon chain fatty acid residue level of greater than 70%, a melting point higher than 57 degrees Celsius, and a solid fat content of greater than 75% at 40 degrees Celsius, wherein said very hard palm oil fraction can be flaked for easy handling because of its high melting point in spite of not being required to undergo hydrogenation.

2. A method of making a hard palm oil fraction, as in claim 1 wherein a pressure of said high pressure membrane filter is at least about 10 bar.

3. A method of making a hard palm oil fraction, as in claim 2 wherein said pressure of said high pressure membrane filter is within about 10 bar and about 35 bar, inclusively.

4. A method of making a trans free hard structural fat, comprising:
   interesterifying a non-hydrogenated, dry fractionated lauric fat with a hard palm oil fraction made according to claim 1, 2 or 3, without further fractionating said hard palm oil fraction.

5. A method of making a trans free hard structural fat, as in claim 4, wherein said lauric fat comprises palm kernel oil or its fractions.

6. A method of making a trans free hard structural fat, as in claim 5, wherein said trans free hard structural fat has a trisaturated triglyceride H3 type less than 25%, wherein "H" denotes the saturated fatty acid residues with carbon numbers greater than or equal to 16.

7. A method of making a fat blend, comprising:
   blending 5-40% of a trans free hard structural fat made according to claim 6 with 60-95% of a liquid oil from the group consisting of sunflower oil, canola oil, soy oil, peanut oil, rice bran oil, olive oil, safflower oil, corn oil, or marine oil, or a blend of any of these oils.

8. A method of making a fat blend, as in claim 7, wherein said liquid oil has a high poly/mono unsaturated level such that in the total fat blend the poly/mono unsaturation level exceeds 40%.

9. A method of making a fat blend, comprising:
blending 5-40% of a trans free hard structural fat made according to claim 5 with 60-95% of a liquid oil from the group consisting of sunflower oil, canola oil, soy oil, peanut oil, rice bran oil, olive oil, safflower oil, corn oil, or marine oil, or a blend of any of these oils.

10. A method of making fat blend, as in claim 9, wherein said liquid oil has a high poly/mono unsaturated level such that in the total fat blend the poly/mono unsaturation level exceeds 40%.

11. A method of making a trans free hard structural fat, as in claim 4, wherein said trans free hard structural fat has a trisaturated triglyceride H3 type less than 20%, wherein "H" denotes the saturated fatty acid residues with carbon numbers greater than or equal to 16.

12. A method of making a fat blend, comprising:
blending 5-40% of a trans free hard structural fat made according to claim 11 with 60-95% of a liquid oil from the group consisting of sunflower oil, canola oil, soy oil, peanut oil, rice bran oil, olive oil, safflower oil, corn oil, or marine oil, or a blend of any of these oils.

13. A method of making a fat blend, as in claim 12, wherein said liquid oil has a high poly/mono unsaturated level such that in the total fat blend the poly/mono unsaturation level exceeds 40%.

14. A method of making a fat blend, comprising:
blending 5-40% of a trans free hard structural fat made according to claim 4 with 60-95% of a liquid oil from the group consisting of sunflower oil, canola oil, soy oil, peanut oil, rice bran oil, olive oil, safflower oil, corn oil, or marine oil, or a blend of any of these oils.

15. A method of making a fat blend, as in claim 14, wherein said liquid oil has a high poly/mono unsaturated level such that in the total fat blend the poly/mono unsaturation level exceeds 40%.

* * * * *